(No Model.)

H. B. TODD.
STOVE PIPE DAMPER.

No. 317,046.  Patented May 5, 1885.

Witnesses:
W. M. Bjerkman
H. R. Williams

Inventor:
Henry B. Todd,
by Simonds & Burdett,
Att'ys

UNITED STATES PATENT OFFICE.

HENRY B. TODD, OF MERIDEN, CONNECTICUT.

STOVE-PIPE DAMPER.

SPECIFICATION forming part of Letters Patent No. 317,046, dated May 5, 1885.

Application filed February 24, 1885. (No model.)

*To all whom it may concern:*

Be it known that I, HENRY B. TODD, of Meriden, in the county of New Haven and State of Connecticut, have invented certain new and useful Improvements in Stove-Pipe Dampers, of which the following is a description, reference being had to the accompanying drawings, where—

Figure 1:
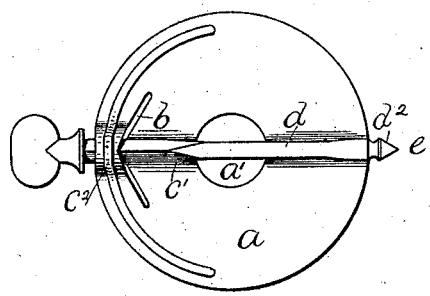
Figure 2:
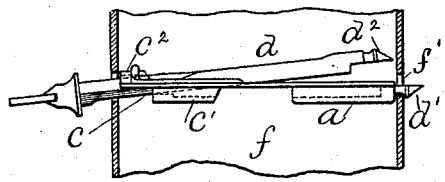
Figure 3:
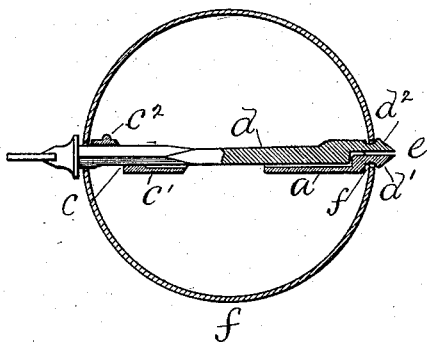

Figure 1 is a plan view of a damper embodying my improvement, showing blade and rod put together. Fig. 2 is an edge view of same. Fig. 3 is a sectional view through a pipe and my improved damper in a plane through the axis of the rod and in cross-section of the blade.

My invention relates to the class of dampers which are held in the desired position in the pipe by the frictional grasp of a spring or like device upon the inner side of the hole through the pipe in which the damper is supported.

My invention consists in the combination of a damper-blade and a rod, each of these parts bearing a section of the pivot on which the damper turns, the sections being sprung apart by the elasticity of the plate or rod, and in certain other details of construction, as more particularly hereinafter described.

In the accompanying drawings, the letter $a$ denotes the blade of a damper that is made, preferably, of metal—as iron—and cast to shape of a thin disk, with the usual opening, $a'$, for the passage of gas. In the form shown a slot, $b$, is made near the edge of the blade and across the rod-socket $c$, the latter being formed in parts $c'$ $c^2$, that lie upon opposite sides of the slot, and embrace opposite sides of the damper-rod $d$ when the latter lies in the socket which extends, substantially, across the damper in the line of the diameter. In the line of this socket, and on the edge of the blade opposite that point where the rod is introduced, is a lug that forms one section, $d'$, of a pivot, $e$, that is made up of this lug and the inner end, $d^2$, of the damper-rod. The damper is supported in the pipe $f$ by the rod near its handle, where it passes through a hole in the pipe, and by the inner end of the rod and the lug or section $d'$ of the pivot. The socket is so formed in the damper that the rod when thrust into it will not lie flat against it, but stands at an angle, as shown in Fig. 2, and pressure upon the inner end is required to bring together the parts $d'$ $d^2$ of the pivot $e$. There is sufficient elasticity in the blade and the rod, one or both, to permit this bringing of these parts together, even when both are made of cast gray iron, and the tendency of these parts to spring outward causes them to bear against the inner edge of the bearing in the stove-pipe with sufficient force to bind and hold the damper with a yielding grasp at any part of its path between the open and closed positions. The rod and socket are usually made angular in cross-section, so that the blade and rod may turn together, and the latter may bear a stop, which, acting with a like part on the blade, determines the proper position of the rod longitudinally in the socket in the blade.

The method of securing my improved damper in a pipe is as follows: The blade is first placed within a pipe, the pivot-section $d'$ being thrust into the hole $f'$ in the pipe $f$, and the rod then pushed through an opposite hole, and through the blade until the end $d^2$ touches the inside of the pipe, as shown in Fig. 2. The rod is then forced down against the blade so that the end $d^2$ is in line with the hole $f'$, when a smart blow or pressure upon the handle of the rod in the direction of its length forces the pivot-section $d^2$ into the hole, the end being tapered to aid this operation.

I claim as my invention—

1. In combination, a damper-rod, $d$, having on its inner end a pivot-section, $d^2$, and a damper-blade, $a$, having a pivot-section, $d'$, and a rod-socket, $c$, with parts $c'$ $c^2$, embracing opposite sides of the rod, whereby the pivot-sections are sprung apart, all substantially as described.

2. In combination, a damper-rod having on its inner end a pivot-section, and a damper-blade having a corresponding pivot-section, a slot extending across the rod-socket, and a rod-socket with parts embracing opposite sides of the rod, whereby the pivot-sections are sprung apart, all substantially as described.

3. In combination, the damper-rod $d$, with pivot-section $d^2$, the damper-blade $a$, with pivot-section $d'$, and rod-socket $c$, with parts $c'$ $c^2$, and in the pipe $f$, the bearing $f'$ in which the pivot-sections are compressed, all substantially as described.

HENRY B. TODD.

Witnesses:
A. L. OTIS,
W. G. WAMUK.